Sept. 17, 1946.  E. C. VENTRES  2,407,908

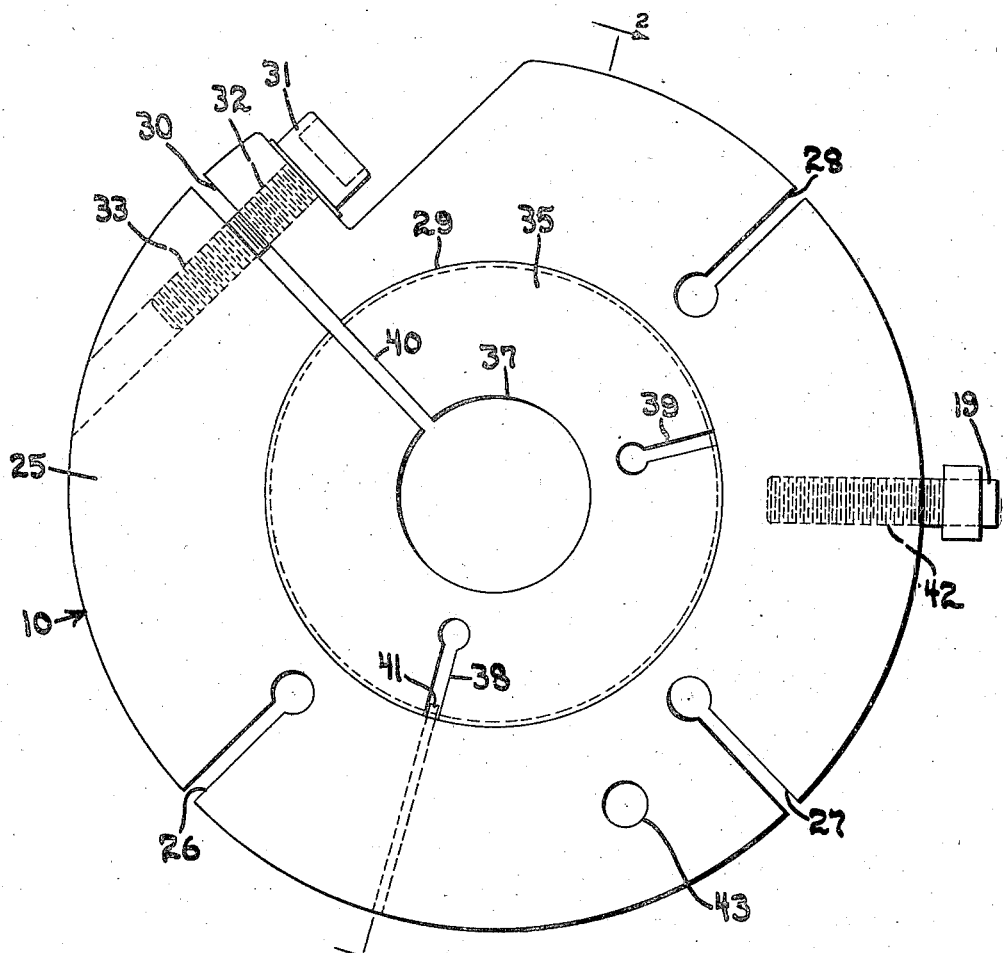

WORK DRIVING DOG

Filed June 20, 1945  2 Sheets-Sheet 2

Inventor
Elio C. Ventres
By Harold W. Eaton
Attorney

Patented Sept. 17, 1946

2,407,908

UNITED STATES PATENT OFFICE 2,407,908

WORK DRIVING DOG

Elio C. Ventres, Worcester, Mass.

Application June 20, 1945, Serial No. 600,587

5 Claims. (Cl. 82—41)

The invention relates to work driving dogs for use in driving cylindrical and other work pieces in a lathe grinding machine or other machine tool.

One object of the invention is to provide an improved work driving dog which may be readily clamped onto a finished surface of a work piece to drive the same for a turning, grinding or other machine operation without injury to the finished surface. Another object of the invention is to provide a work driving dog comprising a split plate having a central aperture of a size to mate with the surface of the work to be driven and means whereby the split plate may be clamped into driving relation with said work piece. Another object of the invention is to provide a work driving dog having an interchangeable central portion which is provided with an aperture corresponding with the surface of the work to be driven and which may be clamped in driving relation with the work piece without injury to the surface thereof.

Another object of the invention is to provide a work driving dog comprising a split driving plate, a split central bushing therein having a central aperture to mate with the surface to be driven in which the split portion of the plate and bushing are aligned so that they may be simultaneously clamped into driving relation with the work piece. Another object of the invention is to provide an improved work driving dog comprising a split driving plate, a split bushing supported therein having a central aperture to mate with the surface of the work, and a quick acting clamping mechanism whereby the plate may be readily clamped to clamp the bushing in driving relation with the surface of the work to be driven. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is an elevation of the improved driving dog;

Fig. 2 is a cross-sectional view, taken approximately on the line 2—2 of Fig. 1;

Figure 5:
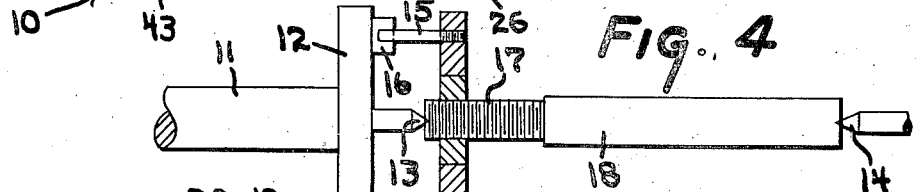
Fig. 5 is a diagrammatic illustration showing the improved driving dog arranged to drive a work piece from a threaded end portion thereof.
Figure 6:
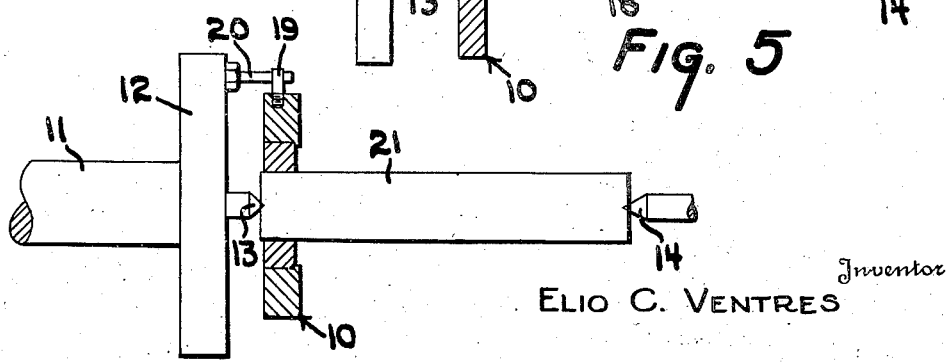
Fig. 6 is a similar diagrammatic view showing the driving dog applied to the end of a cylindrical work piece.

An improved driving dog 10 is illustrated in the drawings for use in connection with lathes, grinding machines or other machine tools having a rotatable headstock spindle 11 (Fig. 5) which drives a face plate 12 and serves as a support for a headstock center 13. The other end of a work piece is supported by a footstock center 14. The driving dog 10 is provided with a driving pin 15 which, as illustrated, projects from the side of the driving dog 10 and is arranged in the path of an adjustably mounted driving lug 16 on the face plate 12. The dog 10 is illustrated as being clamped onto a threaded portion 17 of a work piece 18. A similar diagrammatic illustration is shown in Fig. 6, in which the work driving dog 10 is mounted on the end of a straight cylindrical work piece 21 and a dog driving pin 19 is mounted to project from the outer peripheral surface of the dog 10 in the path of a driving pin 20 which is adjustably supported on the face plate 12.

As illustrated in Fig. 1 of the drawings, the driving dog 10 consists of a disk-shaped plate 25 which is provided with a plurality of radially extending slots 26, 27 and 28 which extend from the periphery to a point adjacent to a central aperture 29 formed in the disk 25. The disk 25 is provided with a slot 30 which extends from the periphery of the disk 25 to the central aperture 29. A clamping screw 31 passes through a clearance hole 32 and is screw threaded into a threaded aperture 33. It will be readily apparent from the foregoing disclosure that by providing a slotted disk, the disk 25 may be readily flexed to clamp the same by tightening the clamping screw 31.

In order to drive a finished work piece for a turning or grinding operation, it is desirable to provide a driving dog which may be readily clamped onto the end portion of the work piece to rotate the same which is constructed so that it will not damage the finished portion of the work piece which is driven. In the preferred construction, a central bushing 35 is provided which is preferably of a relatively soft metal such as, for example, brass, bronze or other similar metals. The bushing 35 mates with the central aperture 29 formed in the plate 25. The aperture 29 is preferably formed with a shouldered portion 36 which serves to align the bushing 35 relative to the plate 25. The bushing 35 is provided with a central aperture 37 of a size to mate with the surface of the work piece to be driven. The bushing 35 is provided with a plurality of radially extending slots 38, 39 and 40. The slots 38 and 39 extend from the outer periphery of the bushing 35 toward the center and the slot 40 extends from the outer peripheral surface of the bushing 35 to the central aperture 37.

In order to provide the desired clamping action, it is desirable that the slot 30 in the plate 25 be aligned with the slot 40 in the bushing 35 which is accomplished by means of a locating pin 41 fixedly mounted in the plate 25 and projecting radially within the aperture 29 formed therein.

The driving pin 19 is shown as supported in a threaded aperture 42 formed in the periphery of the disc 25. If desired, the driving pin 19 may be threaded into a threaded aperture 43 formed in the disk 25 so that the driving pin will project in an axial direction parallel to the axis of the work piece to be driven, if desired.

It will be readily apparent from the foregoing disclosure that by providing a plurality of bushings 35 having inner apertures 37 to mate with the different sizes of work pieces to be turned or ground, the driving dog may be readily used for turning or grinding a series of different types of work pieces merely by interchanging the bushing 35. When it is desired to drive a work piece, the dog 10 is placed over the end of the work piece with the aperture 37 of the bushing 35 engaging an end portion of the work piece, after which the clamping screw 31 may be tightened to clamp the driving plate 25 which in turn clamps the bushing 35 into rigid driving engagement with the surface of the work piece to be turned or ground.

Figure 3:
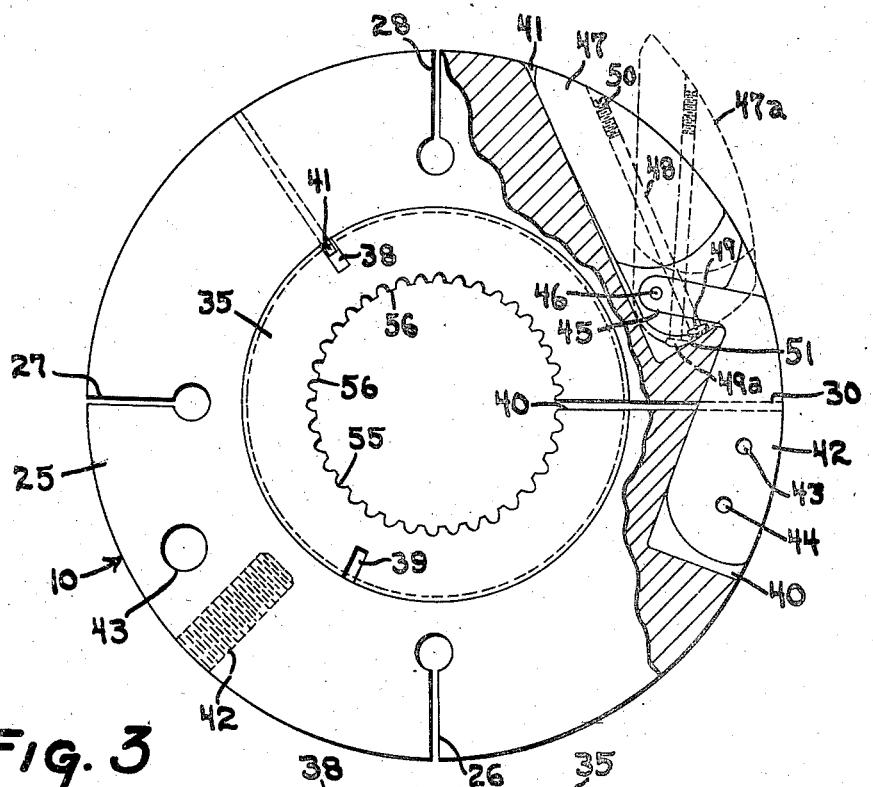
Fig. 3 is an elevation of a modified construction, partly broken away and shown in section, to clarify the structure.
Figure 4:
Fig. 4 is a front elevation of the modified driving dog shown in Fig. 3.

It may be desirable for certain turning or grinding operations to provide a quick acting clamping mechanism for the work driving dog so that it may be readily clamped onto or removed from the surface of the work without the use of wrenches or other tools. As illustrated in Fig. 3, a quick acting clamping mechanism is provided. The driving disk 25 of the dog 10 is provided with cutout portions 40 and 41 which are arranged on opposite sides of the slot 30. A block 42 is fastened in place by pins 43 and 44 in the cut-out portion 40. The block 42 is provided with an inwardly projecting arm 45 which serves as a support for a pivot stud 46. The pivot stud 46 pivotally supports a clamping arm 47 which is arranged to swing to and from a clamping position. The clamping arm 47 is provided with a stud 48 having a cam 49 formed at its lower end (Fig. 3). An adjusting screw 50 is screw threaded into the clamping arm 47 and serves as a means for locating and adjusting the stud 48 and cam 49. The cam 49 is arranged to engage a surface 51 formed in the cut-out portion 41 of the plate 25.

When the clamping arm 47 is in an unclamped or released position, the clamping arm is positioned as shown in dotted lines 47a and the cam 49 is in position 49a. When it is desired to clamp the plate 25 to clamp the bushing 35 into driving relation with the work piece to be turned or ground, the clamping lever is moved from position 47a in a counterclockwise direction into the full line position 47 which serves to shift the cam from position 49a into position 49. This movement of the cam 49a riding on the surface 51 serves to draw the split parts of the disk 25 together and thereby to clamp the bushing 35 in driving relation with the work piece. It will be readily apparent from the foregoing disclosure that by swinging the clamping arm 47 from position 47 into position 47a, the dog may be readily released from the work piece after an operation has been completed. Similarly, the dog may be readily clamped by a corresponding movement of the clamping lever in the reverse direction.

For rough, heavy operations where it is not necessary to consider the surface of the work to be driven, a bushing may if desired be provided with a serrated inner aperture 55 which provides a plurality of spaced work engaging lands 56 which engage the surface of the work to be driven at spaced points around its periphery, thus distributing the clamping pressure at spaced intervals around the periphery of the work piece.

The operation of this improved driving dog may be readily apparent from the foregoing disclosure. A bushing 35 having the desired size of aperture 37 is placed in position within the central aperture 29 of the plate 25. The driving dog 10 is then placed over the end portion of a work piece to be turned or ground and the clamping screw or the clamping arm 47 is then actuated to clamp the driving dog into driving engagement with the work piece to be driven. The driving pin 15 or 19 may be arranged either to project radially from the periphery of the driving dog 10 or laterally as desired, depending upon the nature of the work or the driving means provided on the face plate of the machine. When it is desired to change turning or grinding operations and to turn or grind a different size of work piece, it is merely necessary for the operator to replace the bushing 35 with a bushing having the desired size of central aperture 37, after which the machining operation may be continued with a new set-up.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a work driving dog having a split bushing of relatively soft metal, a central aperture in said bushing arranged to mate with a surface on the work piece to be driven, a split driving plate surrounding the periphery of said bushing, the split in the driving plate being aligned with the split in said bushing, a driving pin adjustably mounted on said driving plate, and a clamping device including means to draw the opposed faces of said slot in the plate toward each other so as to clamp the bushing into driving relation with a work piece.

2. In a work driving dog having a radially split bushing of relatively soft metal, a central aperture in said bushing arranged to mate with a surface on the work piece to be driven, a radially split driving plate surrounding the periphery of said bushing, the split in the driving plate being aligned with the split in said bushing, a driving pin adjustably mounted on said driving plate, and a clamping screw arranged normal to the split in said plate to clamp the plate and bushing into driving relation with said work piece.

3. In a work holding and driving dog having a disk-shaped driving plate, a driving pin thereon, a central aperture in said plate, a radially extending slot through said plate, a clamping screw arranged normal to said slot, a work receiving bushing, the outer periphery of said bushing mating with the aperture in said plate, a central aperture in said bushing to mate with a surface on the work piece to be driven, a radially extending slot through said bushing, and means to align the radial slots in said plate and said bushing so that said clamping screw serves to clamp said bushing to said work piece.

4. In a work holding and driving dog having a disk-shaped driving plate, a central aperture therein, a plurality of radially extending slots therein, one of which extends from the periphery to the central aperture, a work engaging bushing which mates with the central aperture in said plate, a central aperture in said bushing of a size to mate with the periphery of a work piece, radially extending slots in the periphery of said bushing, one of which extends from the periphery to the central aperture, and a clamping mechanism operatively connected with said driving plate on opposite sides of said slot whereby the bushing may be readily clamped into driving relation with a work piece.

5. In a work holding and driving dog, a disk-shaped driving plate, a driving pin adjustably mounted thereon, a central aperture in said plate, a radially extending slot through said plate, a work receiving bushing the outer periphery of which mates with the aperture in said plate, a radially extending slot through said bushing, means to align the radial slots in said plate and said bushing, and a lever actuated clamping mechanism arranged on opposite sides of the radial slot through said plate to facilitate clamping the plate and bushing into driving relation with a work piece.

ELIO C. VENTRES.